United States Patent
Lyons

[11] 3,787,112
[45] Jan. 22, 1974

[54] APPARATUS AND METHOD FOR THE SELF-EXAMINATION OF CERTAIN CONDITIONS OF THE EYE

[76] Inventor: John H. Lyons, 351 Rancho St., Ridgecrest, Calif. 93555

[22] Filed: Aug. 3, 1972

[21] Appl. No.: 277,528

[52] U.S. Cl. .................................. 351/18, 351/39
[51] Int. Cl. ............................................ A61b 3/02
[58] Field of Search ........................... 351/18, 39, 17

[56] References Cited
UNITED STATES PATENTS
3,664,631   5/1972   Guyton ............................ 351/17 X Primary Examiner—Paul A. Sacher

[57] ABSTRACT

Apparatus and method for the self-examination of certain conditions of the eye as, for example, the presence, location and nature of a cataract, retinal damage, scars and injuries, etc. Diffused light is introduced into the eye through an eyepiece supported coaxially of the pupilary axis thereby permitting the user to perceive a cataract on his eye and to view in very substantially enlarged form, the cataract and/or certain other conditions of his own eye on a translucent target or screen forwardly of his eye which target is preferably imprinted with a network of lines useful in the accurate transfer and recording of observed conditions and faults onto a sheet bearing a similar network.

17 Claims, 3 Drawing Figures

PATENTED JAN 22 1974 3,787,112

APPARATUS AND METHOD FOR THE SELF-EXAMINATION OF CERTAIN CONDITIONS OF THE EYE

This invention relates to ophthalmic examining apparatus, and more particularly, to unique equipment of this general type enabling a patient to view in enlarged scale a variety of conditions pertaining to his own eye or eyes, and to a technique enabling the viewer to make an accurate record of observed conditions in his own eye.

Various devices and expedients have been proposed and resorted to heretofore enabling doctors to inspect and analyze diseases and infirmities of the eye. However, all of these are subject to certain limitations and shortcomings obviated by the present invention. Substantially all of these prior devices are subject to the serious shortcoming that the condition is observable only by the eyes of the physician and are subject to the infirmities and limitations of the physician's own eyes. Moreover, certain conditions cannot be detected visually while others are observed only imperfectly and uncertainly. Furthermore and importantly, the patient must rely upon the skill and the judgment of the doctor and has been without means for observing or confirming the diagnosis of the latter.

The foregoing and other serious limitations of prior ophthalmic equipment and procedures are avoided by the present invention utilizing very simple equipment designed for use directly by the patient himself and so designed that the patient can view numerous conditions of his own eye on a greatly enlarged scale and preferably displayed against a grid or network enabling the patient easily to make a record to scale of the observed conditions. This record is made on a duplicate of the network drawn to the same or other convenient and suitable scale. This technique makes it a simple matter to make periodic examinations and recordings for comparison with one another to show the rate and nature of any development. The source of light is diffused through a translucent medium to illuminate a translucent target which is viewed through a non-collimating eyepiece in alignment with the pupilary axis of the patient's eye. The patient then views the target area and observes a condition displayed thereon, such as shadows of varying density and configuration representative of scars or cataract conditions on either the lens or the cornea. Alternatively, an area of the network may appear to be out of focus or devoid of lines, a result indicative of the degree of damage in a corresponding area of the retina. Certain lines on the target may appear to the viewer to waver or vibrate, a condition characteristic of some form of retinitis. Floaters or motes present in the fluid filling the eyeball are also readily identified.

Accordingly, it is a primary object of the present invention to provide an improved method and technique for the self-examination of the eye by means enabling the patient himself to observe a variety of conditions both directly and on a projected magnified scale.

Another object of the invention is the provision of simple, easily operated, reliable means providing a non-collimated source of light for the eye and enabling a patient to observe critical conditions of his own eyes and to make an accurate record of each observed condition.

Another object of the invention is the provision of unique ophthalmic equipment by which a patient can confirm and directly observe on a magnified scale physiological conditions of his own eye. These and other more specific objects will appear upon reading the following specification and claims and upon considering in connection therewith the attached drawing to which they relate.

Referring now to the drawing in which a preferred embodiment of the invention is illustrated:

Figure 1:
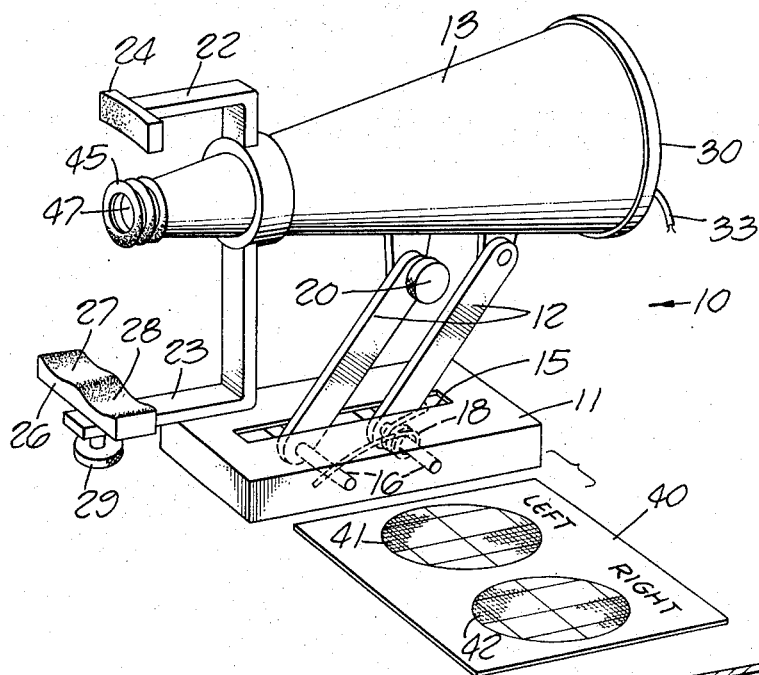
FIG. 1 is a perspective view of an illustrative embodiment of means suitable for practicing the invention method of examining one's own eyes and of recording observed conditions.
Figure 2:
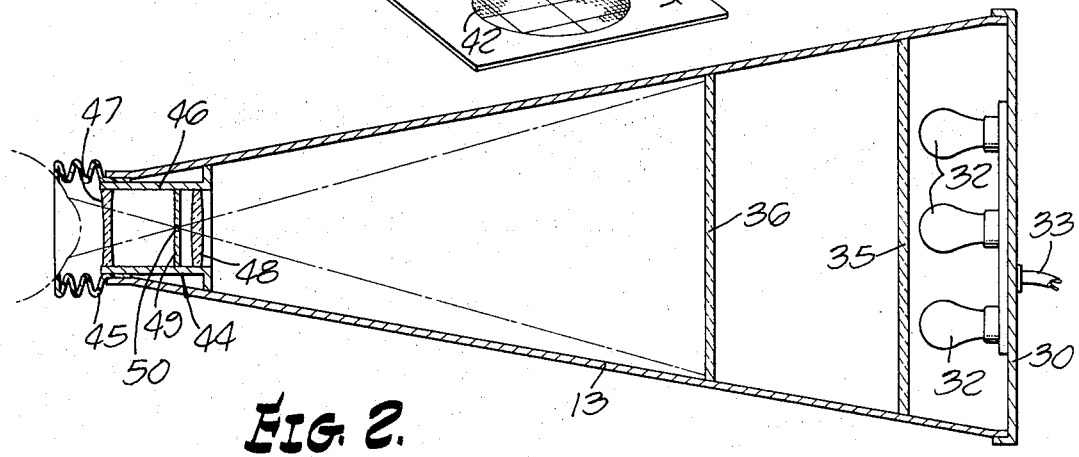
FIG. 2 is an axial cross sectional view through the principal components of the apparatus.

Referring initially more particularly to FIG. 1, there is shown an embodiment of the invention, designated generally 10, and comprising a base 11 provided with a parallelogram linkage 12,12 adjustably supporting a conical main housing 13. Base 11 is slotted at 15 to receive the lower ends of a pair of parallelogram links 12 which are journalled at their lower ends on a pair of pins 16 seated in and extending crosswise of the interior of base 11. A torsion spring 18 encircling one of the pins has one end bearing against link 12 and the other end against a fixed anchorage in the base. This spring substantially counterbalances the weight of the moving parts associated with housing 13. The upper ends of links 12 are pivoted to housing 13 and include a clamping thumb nut 20 for clamping the links and housing in any desired position.

Suitably secured to the rear end portion of housing 13 are a pair of brackets 22,23 the upper one of which is utilized to support a soft rest 24 for the user's forehead. Adjustably supported on the outer end of bracket 23 is a chin rest 26 hving a pair of padded concavities 27,28 in a selected one of which the chin is rested depending on whether the right or left eye is being examined. Chin rest 26 is vertically adjustable by a hand screw 29 having its stem extending through a threaded opening in the outer end of bracket 23.

The larger forward end of housing 13 is closed by removable closure plate 30 on the interior of which is supported one or more lamps 32 connected to a service cord 33. Supported forwardly of lamp 32 is a translucent panel 35 or other suitable means for distributing the light from the lamps and illuminating the translucent target panel 36. The viewed face of target 36 is imprinted with a grid or network of fine sharp lines crisscrossing one another and subdivided into groups by a grid of heavier lines 39 as in the pattern illustrated in FIG. 3. One set of the heavy lines is preferably located respectively, on the horizontal and vertical diametric bisectors of the target, and others are disposed to either side of these lines. If desired, appropriate indicia may be added to the target to aid the viewer in accurately designating a particular area of the target and relating this area to an identical reproduction of the network on a sheet of recording material 40. These record grids 41,42 are employed by the viewer to make a graphical scale record of the conditions viewed by him when looking at his left and right eyes 41,42.

Mounted in the smaller end of housing 13 is an eyepiece 44 enshrouded by a soft rubber bellows 45. Eyepiece 44 comprises an open ended tube 46 supporting a negative lens 47 at its outer end, a positive lens 48 at its inner end and a disc 49 between these two lenses having an aperture or a pin hole 50 at its center. Typically, the negative lens 47 may have a focal length of 100 millimeters and the positive lens 48 a focal length of 50-75 millimeters. Disc 49 has a pin hole of about 7 millimeters in diameter and is located about one centimeter from lens 48.

The presence of the soft lens close to the eye tends to slightly flatten out the viewing angle thereby allowing a somewhat larger aperture 50 and a corresponding increase in field illumination while still permitting the aperture to act as a smaller equivalent pin hole. The positive lens 48 likewise complements the negative lens 47 as respects the use of the larger pin hole 50 and, by using one having a somewhat shorter focal length than that of lens 47, a desirable degree of magnification is achieved advantageous in defining observed faults in the eye lens. A fully dark adapted pupil typically has a pupilar aperture of about 8 millimeters and this corresponds generally with the size of pin hole 50 found to provide sharp definitions of faults when used with the herein mentioned lens 47,48.

It will be understood that various other types and combinations of lenses can be utilized as an optical system in lieu of the system just described, and are within the confines of this invention. Such systems are costly and provide no marked advantage over the optical system in eye piece 44.

Figure 3:
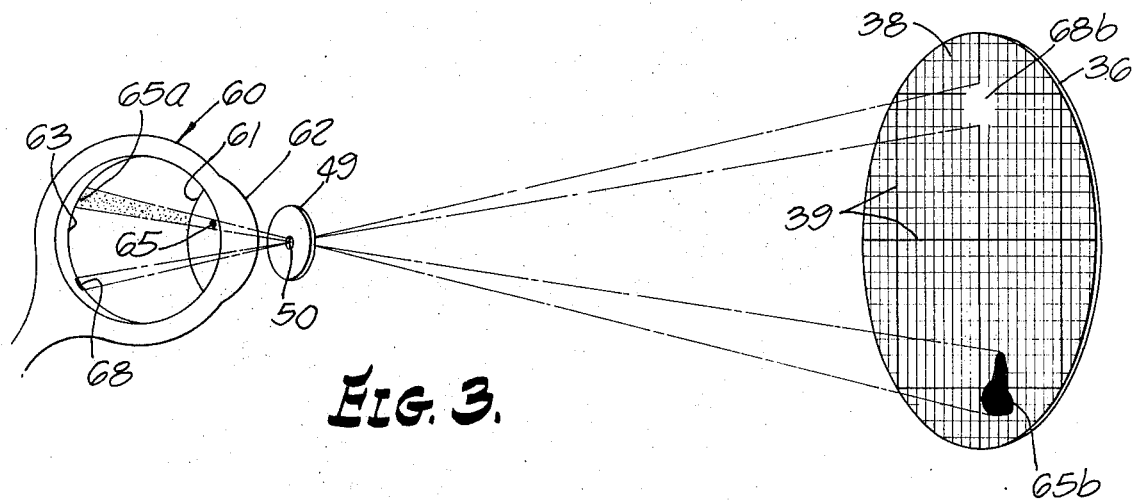
FIG. 3 is a diagrammatic view illustrative of the optical principles utilized in practicing this invention.

Referring now to FIG. 3, there is shown a diagrammatic cross sectional representation through an eyeball 60 and showing the manner in which non collimated light entering the interior of the eye through lens 61 is utilized in the eye to detect two typical defective conditions. The non-collimated diffused light enters through the cornea 62 and lens 61 and impinges upon the semispherical shaped retinal area 63. If a cataract 65 has developed, such as in the area 65 of lens 61, such cataract will be perceived or sensed by areas 65a of the retina upon which a shadow of the cataract is cast by the entering collimated light with the result that the viewer will see an enlarged shadow 65b of corresponding shape on target 36 as is designated in FIG. 3. Experience with the invention technique discloses that cataracts vary endlessly in size, shape, opaqueness, and direction of growth and spreading. It has also been demonstrated that the viewer can observe and record these variations with great fidelity and accuracy, and can readily distinguish areas of varying opaqueness thereby enabling the ophthalmologist to diagnose and prescribe for the patient on the basis of precise and reliable information.

A second typical eye condition or infirmity comprises a damaged area 68 of the retina and typically comprising damaged nerves such as that caused by exposure to excessively intense light rays. Retinal nerves in this area are incapable of normal stimulation by light with the result that grid lines in the area 68b of the target will either be out of focus or will not be perceived in that area and cannot be viewed. The viewer is therefore of the impression that the lines in this area are out of focus or else have been removed from the target, depending on the degree of damage to the retina. The viewer therefore encircles this area and makes a note that all lines within that area are either out of focus or invisible to him.

Another typically observed condition of the target may comprise one or more horizontal, or one or more vertical lines in the network which appear as wavy lines or which appear to vibrate crosswise of the plane of the lines. This observed condition suggests some form of retinitis, the cause of which may warrant further examinations. The ophthalmologist or technician in charge of the use of the invention instrument is then alerted to have the patient examined by an expert skilled in those fields which would confirm the cause of the observed condition.

Another condition commonly observed is the presence of motes or floaters in the fluid filling the eyeball. These are readily detected and observed in enlarged form, usually appearing to be in movement across the face of the target. Scars to the eye are also readily observed as shadows which move across the face of the target with eye motion.

While the particular apparatus and method for the self-examination of certain conditions of the eye herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That method of self-examining the eye for certain visually observable abnormalities which comprises: introducing non-collimated light into the eye through an aperture positioned close to the eye coaxially of the pupilary axis, and viewing a lighted target network forwardly of the eye and coaxially of the pupilary axis to determine the presence and nature of visually observable conditions on the surface thereof indicative of abnormalities in the eye.

2. That method of self-examining the eye defined in claim 1 characterized in the step of recoring the area snd nature of the observed conditions apparent on the target network on a record sheet containing a similar target grid.

3. That method defined in claim 1 characterized in the step of enclosing the zone between the user's eye and the target network in shroud means effective as a barrier for ambient light.

4. That method defined in claim 1 characterized in the step of locating said target network on a surface illuminated by diffused light.

5. That method defined in claim 1 characterized in the step of manipulating a writing instrument to make a graphical scale record of the observed appearance of the target network on a replica of said target network.

6. That method defined in claim 1 characterized in the step of observing said target network to determine the presence thereon of apparent non- or poorly-illuminated areas indicative of a cataract condition.

7. That method defined in claim 1 characterized in the step of observing said target network to determine the apparent absence or out of focus appearance of an area of the target network indicative of the degree of damage to the optically related area of the observer's retina.

8. That method defined in claim 1 characterized in the step of observing said target network to determine if any one or more lines of the target network appear to shift position, vibrate or become wavy and indicative of associated eye abnormalities.

9. That method of self-examining the eye for abnormalities which comprises: viewing an enshrouded illuminated target network of closely spaced grid lines through pin hole means positioned closely adjacent the pupil of the eye and through which non-collimated light is introduced into the eye along the pupilary axis, and observing whether any area of said target network appears to differ in appearance from any other area thereof.

10. That method defined in claim 9 characterized in manipulating a writing instrument to make a graphical record on a replica of the target network of the user's observations for analysis and evaluation by skilled personnel.

11. Apparatus for the self-examination of the eye comprising means defining an aperture for introducing non-collimated light into the eye along the pupilary axis from a point on said axis spaced closely to the eye, and means supporting a lighted target forwardly of the eye and coaxially of the pupilary axis provided with subdivision lines to aid the user in identifying and locating the area and nature of conditions observed by him as apparently existing at the target surface.

12. Apparatus as defined in claim 11 characterized in that said means for introducing non-collimated light into the eye includes eyepiece means having said aperture defining means coaxially thereof, and shroud means extending between said eyepiece means and said target effective to exclude ambient light.

13. Apparatus as defined in claim 11 characterized in the provision of rest means engageable with facial surfaces of the user when one of the user's pupils is in axial alignment with said means for introducing collimated light into the eye.

14. Apparatus as defined in claim 12 characterized in the provision of rest means for the observer's chin and positionable to aid in aligning and supporting the observer's optical axis with the optical axis of said eyepiece.

15. Apparatus as defined in claim 12 characterized in that said apparatus includes a main base, and means adjustably interconnecting said main base and said shroud means.

16. Apparatus as defined in claim 11 characterized in that said target means is translucent and includes a multiplicity of closely spaced lines.

17. Apparatus as defined in claim 11 characterized in that said target means is translucent and includes a multiplicity of closely spaced lines criss-crossing one another.

* * * * *